(12) United States Patent
Bergman et al.

(10) Patent No.: US 8,132,827 B2
(45) Date of Patent: Mar. 13, 2012

(54) VEHICLE

(75) Inventors: James Bergman, Oslo, MN (US); Larry Holter, Alvarado, MN (US); Richard Nelson, Oslo, MN (US); Lionel Hoff, Oslo, MN (US); Doug Moman, Warren, MN (US); Joshua J. Leonard, North Branch, MN (US); Mitchell D. Johnson, Rosseau, MN (US); Richard Raymond Maki, North Branch, MN (US); Eric Bjerkelvedt, North Branch, MN (US); Bradley Robert Morisch, Lindstrom, MN (US); Brian D. Krosschell, Chicago City, MN (US); Louis J. Brady, Wyoming, MN (US); Michael D. Schneider, Dalbo, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 12/875,915

(22) Filed: Sep. 3, 2010

(65) Prior Publication Data

US 2010/0326757 A1 Dec. 30, 2010

Related U.S. Application Data

(62) Division of application No. 12/092,191, filed as application No. PCT/US2008/003485 on Mar. 17, 2008, now Pat. No. 7,795,602.

(60) Provisional application No. 60/918,556, filed on Mar. 16, 2007.

(51) Int. Cl.
*B60R 21/02* (2006.01)

(52) U.S. Cl. .......... 280/748; 280/756; 280/781
(58) Field of Classification Search ............... 180/89.1, 180/68.2, 311, 312; 280/775, 781, 756, 748
See application file for complete search history.

(56) References Cited

U.S. PATENT DOCUMENTS

| 2,672,103 A | 3/1954 | Hohmes |
| 3,858,902 A | 1/1975 | Howells et al. |
| 4,027,892 A | 6/1977 | Parks |
| 4,098,414 A | 7/1978 | Abiera |
| 4,561,323 A | 12/1985 | Stromberg |
| 4,773,675 A * | 9/1988 | Kosuge .......... 280/781 |
| 4,821,825 A | 4/1989 | Somerton-Rayner |
| 4,934,737 A | 6/1990 | Nakatsuka |
| 5,036,939 A | 8/1991 | Johnson et al. |
| 5,251,713 A | 10/1993 | Enokimoto |
| 5,863,277 A | 1/1999 | Melbourne |

(Continued)

FOREIGN PATENT DOCUMENTS

CH 317 335 A 11/1956

(Continued)

OTHER PUBLICATIONS

International Search Report and Written Opinion for PCT/US2008/003485 issued by the European Patent Office on Aug. 27, 2008.

(Continued)

*Primary Examiner* — Toan To
(74) *Attorney, Agent, or Firm* — Faegre Baker Daniels LLP

(57) ABSTRACT

A utility vehicle with ergonomic, safety, and maintenance features is disclosed. The ergonomic, safety, and maintenance features enhance the utility of the vehicle.

21 Claims, 17 Drawing Sheets

U.S. PATENT DOCUMENTS

| | | | |
|---|---|---|---|
| 5,950,750 A | 9/1999 | Dong et al. | |
| 6,092,877 A | 7/2000 | Rasidescu et al. | |
| 6,149,540 A | 11/2000 | Johnson et al. | |
| 6,199,894 B1 | 3/2001 | Anderson | |
| 6,467,787 B1 | 10/2002 | Marsh | |
| 6,622,968 B1 | 9/2003 | St. Clair et al. | |
| 6,695,566 B2 | 2/2004 | Rodriguez Navio | |
| 6,725,962 B1 | 4/2004 | Fukuda | |
| 6,752,235 B1 | 6/2004 | Bell et al. | |
| 6,786,526 B1 | 9/2004 | Blalock | |
| 6,799,779 B2 | 10/2004 | Shibayama | |
| 6,799,781 B2 | 10/2004 | Rasidescu et al. | |
| 6,916,142 B2 | 7/2005 | Hansen et al. | |
| 6,923,507 B1 | 8/2005 | Billberg et al. | |
| 6,978,857 B2 | 12/2005 | Korenjak | |
| 7,055,454 B1 | 6/2006 | Whiting et al. | |
| 7,124,853 B1 | 10/2006 | Kole | |
| 7,125,134 B1 | 10/2006 | Hedlund et al. | |
| 7,237,789 B1 | 7/2007 | Herman | |
| 7,239,032 B1 | 7/2007 | Wilson et al. | |
| 7,431,024 B2 | 10/2008 | Buchwitz et al. | |
| 7,795,602 B2 | 9/2010 | Leonard et al. | |
| 7,874,605 B2 * | 1/2011 | Smith et al. | 296/64 |
| D636,295 S * | 4/2011 | Eck et al. | D12/1 |
| 2002/0147072 A1 | 10/2002 | Goodell et al. | |
| 2002/0178968 A1 | 12/2002 | Christensen | |
| 2003/0001409 A1 | 1/2003 | Semple et al. | |
| 2004/0079561 A1 | 4/2004 | Ozawa et al. | |
| 2004/0108159 A1 | 6/2004 | Rondeau et al. | |
| 2004/0195797 A1 | 10/2004 | Nash et al. | |
| 2005/0173177 A1 | 8/2005 | Smith et al. | |
| 2005/0173180 A1 | 8/2005 | Hypes et al. | |
| 2005/0248116 A1 | 11/2005 | Fanson | |
| 2006/0098448 A1 | 5/2006 | Coast et al. | |
| 2008/0023240 A1 | 1/2008 | Sunsdahl et al. | |
| 2008/0023249 A1 * | 1/2008 | Sunsdahl et al. | 180/312 |
| 2008/0289896 A1 * | 11/2008 | Kosuge et al. | 180/312 |
| 2008/0308334 A1 * | 12/2008 | Leonard et al. | 180/89.1 |
| 2009/0000849 A1 * | 1/2009 | Leonard et al. | 180/311 |
| 2009/0071739 A1 * | 3/2009 | Leonard et al. | 180/209 |
| 2009/0091101 A1 * | 4/2009 | Leonard et al. | 280/638 |
| 2009/0121518 A1 * | 5/2009 | Leonard et al. | 296/183.1 |
| 2009/0184541 A1 * | 7/2009 | Yamamura et al. | 296/190.08 |
| 2009/0302590 A1 * | 12/2009 | Van Bronkhorst et al. | 280/756 |

FOREIGN PATENT DOCUMENTS

| | | |
|---|---|---|
| DE | 116 605 C | 2/1900 |
| DE | 17 55 101 A1 | 4/1971 |
| DE | 30 33 707 A | 4/1982 |
| EP | 0238077 A | 9/1987 |
| EP | 0 709 247 A | 5/1996 |
| EP | 0794096 A | 9/1997 |
| EP | 1 215 107 A | 6/2002 |
| EP | 1557345 A | 7/2005 |
| EP | 1 564 123 A | 8/2005 |
| JP | 11 334447 A | 12/1999 |
| JP | 2000 177434 A | 6/2000 |

OTHER PUBLICATIONS

International Search Report and Written Opinion for PCT/US2008/003480 issued by the European Patent Office on Sep. 1, 2008.

International Search Report and Written Opinion for PCT/US2008/003483 issued by the European Patent Office on Oct. 2, 2008.

International Preliminary Report on Patentability for PCT/US2008/003483 issued by the European Patent Office on May 11, 2009.

* cited by examiner

VEHICLE

CROSS-REFERENCE TO RELATED APPLICATIONS

The present application is a divisional application of U.S. patent application Ser. No. 12/092,191; which is a National Stage Application of International Application No. PCT/US08/03485, filed Mar. 17, 2008, titled VEHICLE, and claims the benefit of U.S. Provisional Application Ser. No. 60/918,556, filed Mar. 16, 2007, the disclosures of which are expressly incorporated by reference herein.

The disclosures of U.S. Provisional Application Ser. No. 60/918,502, filed Mar. 16, 2007, titled "VEHICLE", U.S. Provisional Application Ser. No. 60/918,444, filed Mar. 16, 2007, titled "VEHICLE WITH SPACE UTILIZATION", U.S. Provisional Application Ser. No. 60/918,356, filed Mar. 16, 2007, titled "UTILITY VEHICLE HAVING MODULAR COMPONENTS", and U.S. Provisional Application Ser. No. 60/918,500, filed Mar. 16, 2007, titled "METHOD AND APPARATUS RELATED TO TRANSPORTABILITY OF A VEHICLE", are expressly incorporated by reference herein.

STATEMENT REGARDING FEDERALLY SPONSORED RESEARCH OR DEVELOPMENT

Portions of this application may be subject to the terms of contract number H92222-06-C-0039 with the United States Special Operations Command (SOCOM).

FIELD OF THE INVENTION

The present invention relates generally to a vehicle and in particular to a vehicle with ergonomic, safety, maintenance, and other features.

BACKGROUND AND SUMMARY OF THE INVENTION

Vehicles including utility vehicles, all-terrain vehicles, tractors, snowmobiles, watercraft, and others are known. It is known to provide vehicles with forward and rear covered storage compartments such as trunks. It is also known to provide vehicles with rear platforms covered by roofs and with exposed rear cargo beds. It is also known to attach sub-assemblies having axles, such as trailers, to vehicle hitches in a pivotal manner.

Utility vehicles are also available which comprise a plurality of ground engagement members, a main frame supported by a first portion of the plurality of ground engagement members, an engine supported by the main frame and configured to provide power to at least one of the plurality of ground engaging members, an operator area supported by the main frame, the operator area including seating for at least two occupants in a side-by-side arrangement, steering controls operatively coupled to at least a portion of the plurality of ground engagement members, and engine controls operatively coupled to the engine. For example, a utility vehicle of the type disclosed above is shown in our U.S. Pat. No. 6,923, 507. It is desirable to provide a vehicle of this general type which might be used for military capable operations.

In one embodiment, the vehicle has a frame, an engine, ground engaging members, an operator area, and a dashboard. The vehicle has a steering wheel for use by an operator and a grab bar adjustably coupled to the dashboard to provide a hand grip for a passenger of the vehicle. The grab bar is adjustable within a range of motion.

In another embodiment, the utility vehicle has seating and a restrictor member to selectively restrict an operator's feet from leaving the operator space. The restrictor member is supported by the frame and has its uppermost portion located below the seating surface.

In a further embodiment, the vehicle has an accessory mount; The accessory mount includes a shaft and a first arm. The shaft is supported by the frame. The first arm is coupled to the shaft on one end and is adapted to support an accessory on the opposite end. The first arm rotates about the shaft.

In yet another embodiment, the vehicle has an anti-deflection member to reduce deflection of the main frame about the floor. The anti-deflection member is positioned above the floor and extends from behind the operator space to the dashboard.

In still another embodiment, a vehicle having a frame, an engine, and a housing is disclosed. The housing includes a first housing portion comprising a first bore, a second housing portion comprising a second bore aligned with the first bore, and a lath detachably coupling the first housing portion and the second housing portion. The latch includes a base member, first and second posts, a lever pivotably coupled to the base member, a clip including two ends, and a hook.

In another embodiment, a method of improving the functionality of a vehicle having a housing is disclosed. The method includes the steps of providing the first and second housing portions and a fastener passing through their first and second bores, providing a latch, removing the fastener, and inserting the first and second posts of the latch into the first and second bores to detachably couple the first and second housing portions.

In a further embodiment, a utility vehicle having visible and infrared lights is provided. The vehicle includes a source of infrared light having a first characteristic and a source of infrared light having a second characteristic. The vehicle also includes a light switch to shut off the source of visible light and the source of infrared light having the first characteristic.

In another embodiment, a utility vehicle is provided having an engine including an electrical generator and a battery for receiving energy from the electrical generator. A power control device is also provided for effecting a control action that maintains the amount of energy stored by the battery at or above a predefined amount.

In another embodiment, the vehicle has a frame, an engine, ground engaging members, an operator area, and a dashboard. The vehicle also has seating. The engine is positioned at least partially below the seating. A cargo platform is positioned forward of the dashboard and at least partially between the front ground engaging members with its upper surface being positioned below the top surface of the dashboard. A radiator is positioned below the lower surface of the cargo platform.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, where.

Corresponding reference characters indicate corresponding parts throughout the several views. Unless stated otherwise the drawings are proportional.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as all-terrain vehicles, motorcycles, watercraft, snowmobiles, and golf carts.

Figure 1:
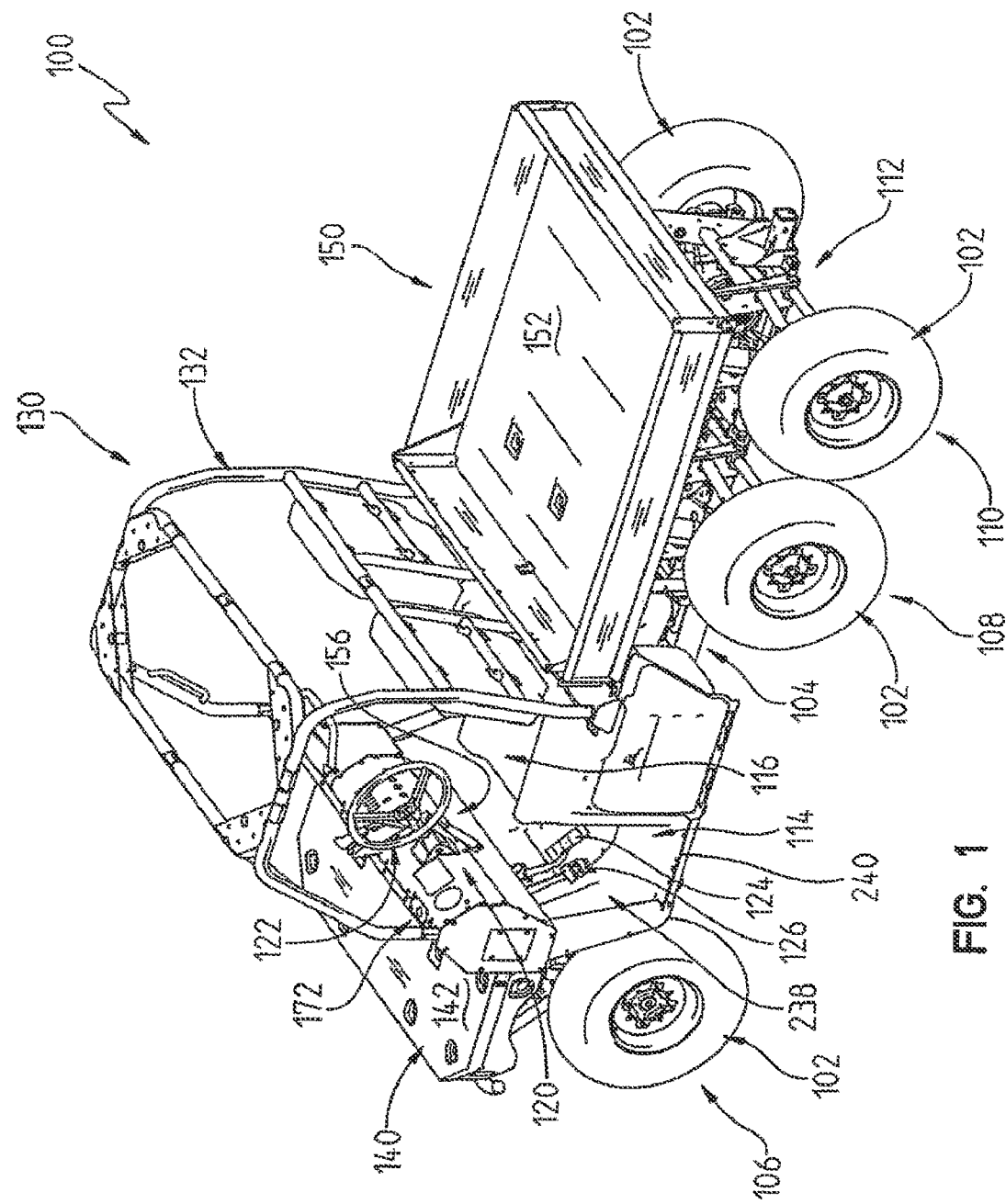
FIG. 1 is a rear, perspective view of a vehicle from a first side of the vehicle, the vehicle including a front platform and a rear platform.

Referring to FIG. 1, an illustrative embodiment of a vehicle 100 is shown. Vehicle 100 as illustrated includes a plurality of ground engaging members 102, illustratively wheels. A first set of wheels, one on each side of vehicle 100, generally correspond to a front axle 106. A second set of wheels, one on each side of vehicle 100, generally correspond to a middle axle 108. A third set of wheels, one on each side of vehicle 100, generally correspond to a rear axle 110.

In one embodiment, one or more of the wheels may be replaced with tracks, such as the Prospector II Tracks available from Polaris Industries, Inc. located at 2100 Highway 55 in Medina, Minn. 55340. In one embodiment, a track is placed around the tires of the wheels middle axle 108 and rear axle 110 on each side of vehicle 100.

Vehicle 100 further includes a frame 104 supported by the plurality of ground engaging members 102. As explained in more detail in U.S. Provisional Application Ser. No. 60/918, 502, filed Mar. 16, 2007, titled "VEHICLE", frame 104 may include a modular subsection 112 which is supported by rear axle 110. Modular subsection 112 may be removed from the remainder of vehicle 100 to convert vehicle 100 from a six-wheeled vehicle to a four-wheeled vehicle. Further, additional modular subsections 112 may be added to vehicle 100 to convert vehicle 100 from a six-wheeled vehicle to an eight-wheeled vehicle or more.

Vehicle 100 includes an operator area 114 which includes seating 116 for one or more passengers. Operator area 114 further includes a plurality of operator controls 120 by which an operator may provide input into the control of vehicle 100. Controls 120 include a steering wheel 122 which is rotated by the operator to change the orientation of one or more of ground engaging members 102, such as the wheels associated with front axle 106, to steer vehicle 100.

Controls 120 also include a first foot pedal 124 actuable by the operator to control the acceleration and speed of vehicle 100 through the control of an engine described in more detail in U.S. Provisional Application Ser. No. 60/918,502, filed Mar. 16, 2007, titled "VEHICLE", and a second foot pedal 126 actuable by the operator to decelerate vehicle 100 through a braking system described in more detail in U.S. Provisional Application Ser. No. 60/918,502, filed Mar. 16, 2007, titled "VEHICLE", Frame 104 includes a portion 130 extending above operator area 114. Portion 130 is provided to protect the occupants of operator area 114 if vehicle 100 tips or rolls over. In the illustrated embodiment, portion 130 is a roll cage 132. In one embodiment, portion 130 is moveable from a first position protecting operator area 114 to a second position which provides vehicle 100 with a smaller envelope than when portion 130 is in the first position. Additional details about exemplary moveable portions are provided in U.S. Provisional Application Ser. No. 60/918,500, filed Mar. 16, 2007, titled "METHOD AND APPARATUS RELATED TO TRANSPORTABILITY OF A VEHICLE", Vehicle 100 further includes a front platform 140 supported by frame 104 and a rear platform 150 supported by frame 104. Both front platform 140 and rear platform 150 are shown having a support surface 142 and 152, respectively. Support surfaces 142 and 152 may be flat, contoured, and/or comprised of several sections. In additional one or both of front platform 140 and rear platform 150 may include upstanding walls to define a cargo box extending over at least a portion of the respective platform 140 and 150.

Figure 2:
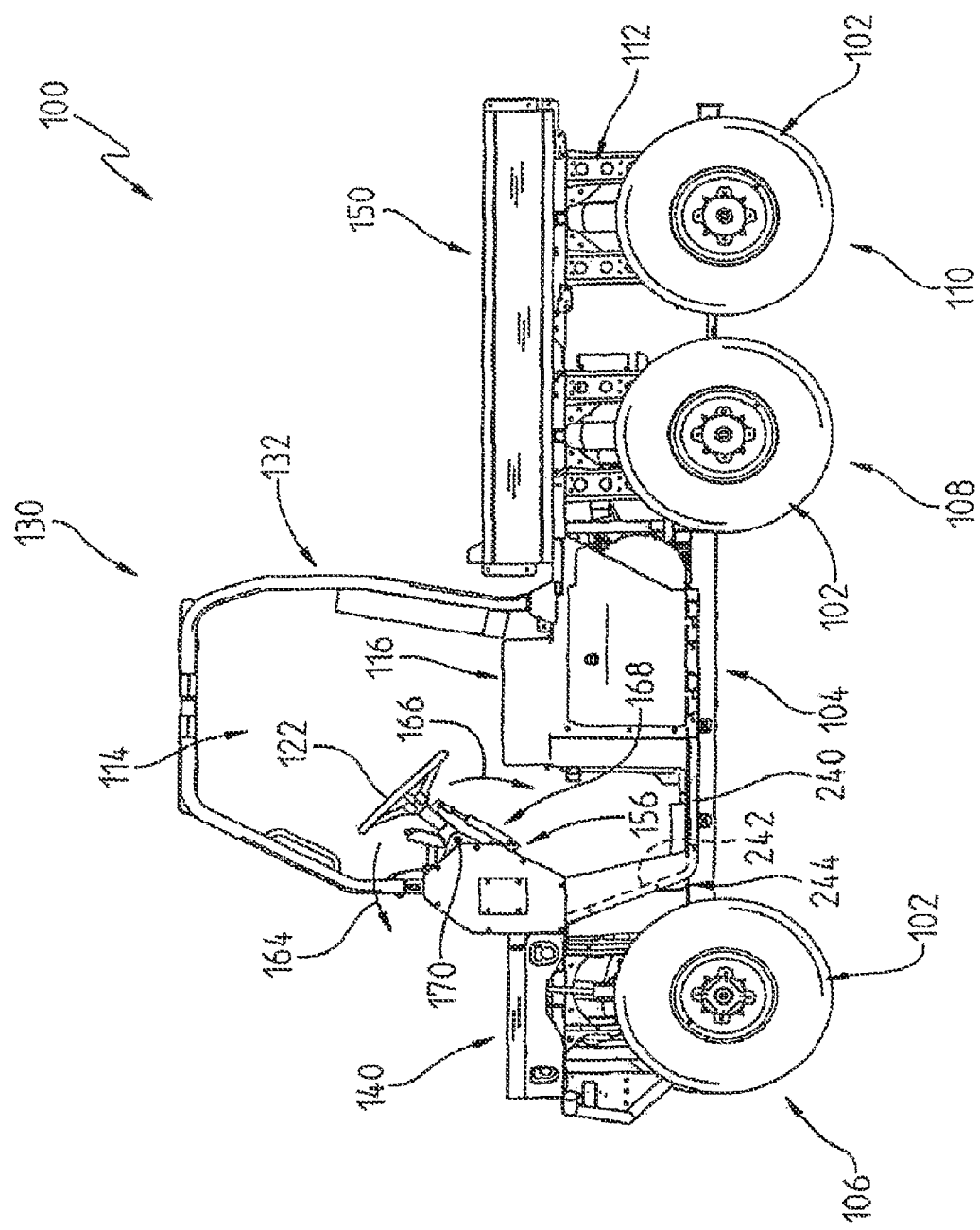
FIG. 2 is a side view of the first side of the vehicle of FIG. 1.
Figure 3:
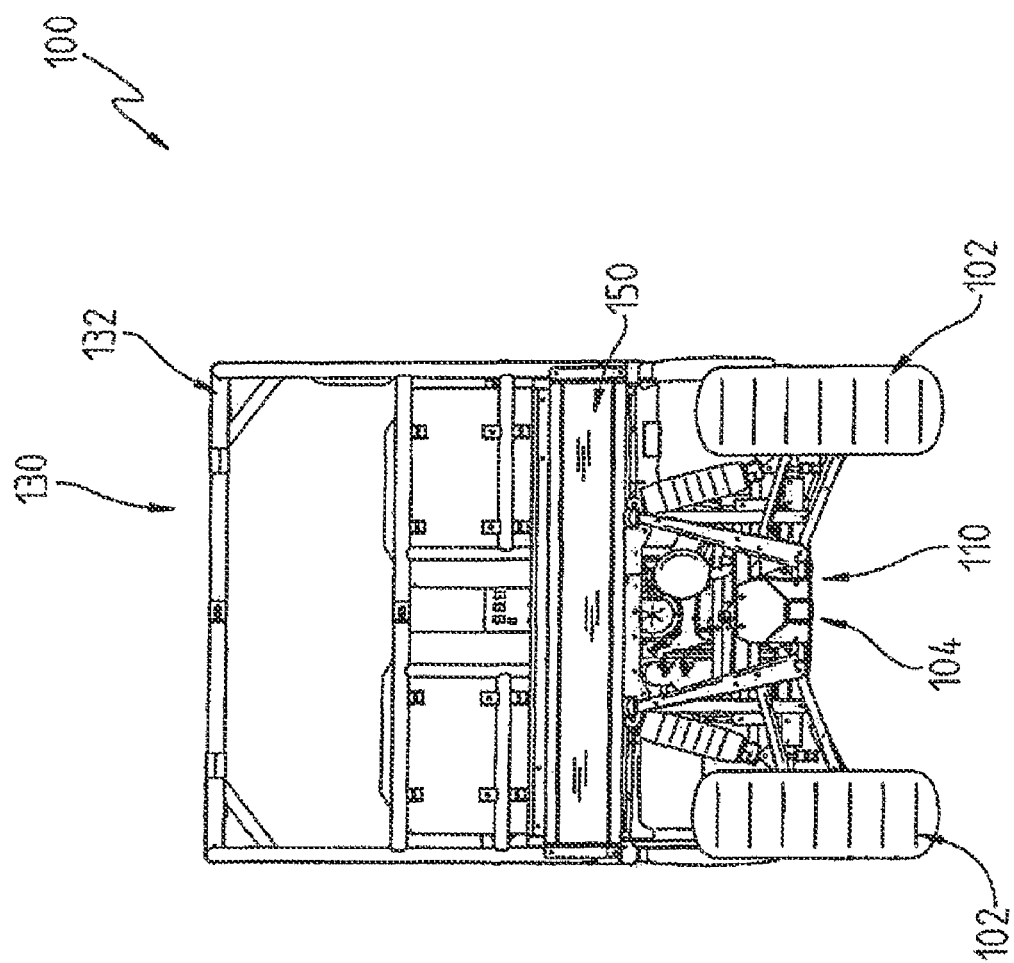
FIG. 3 is a rear view of the vehicle of FIG. 1.
Figure 4:
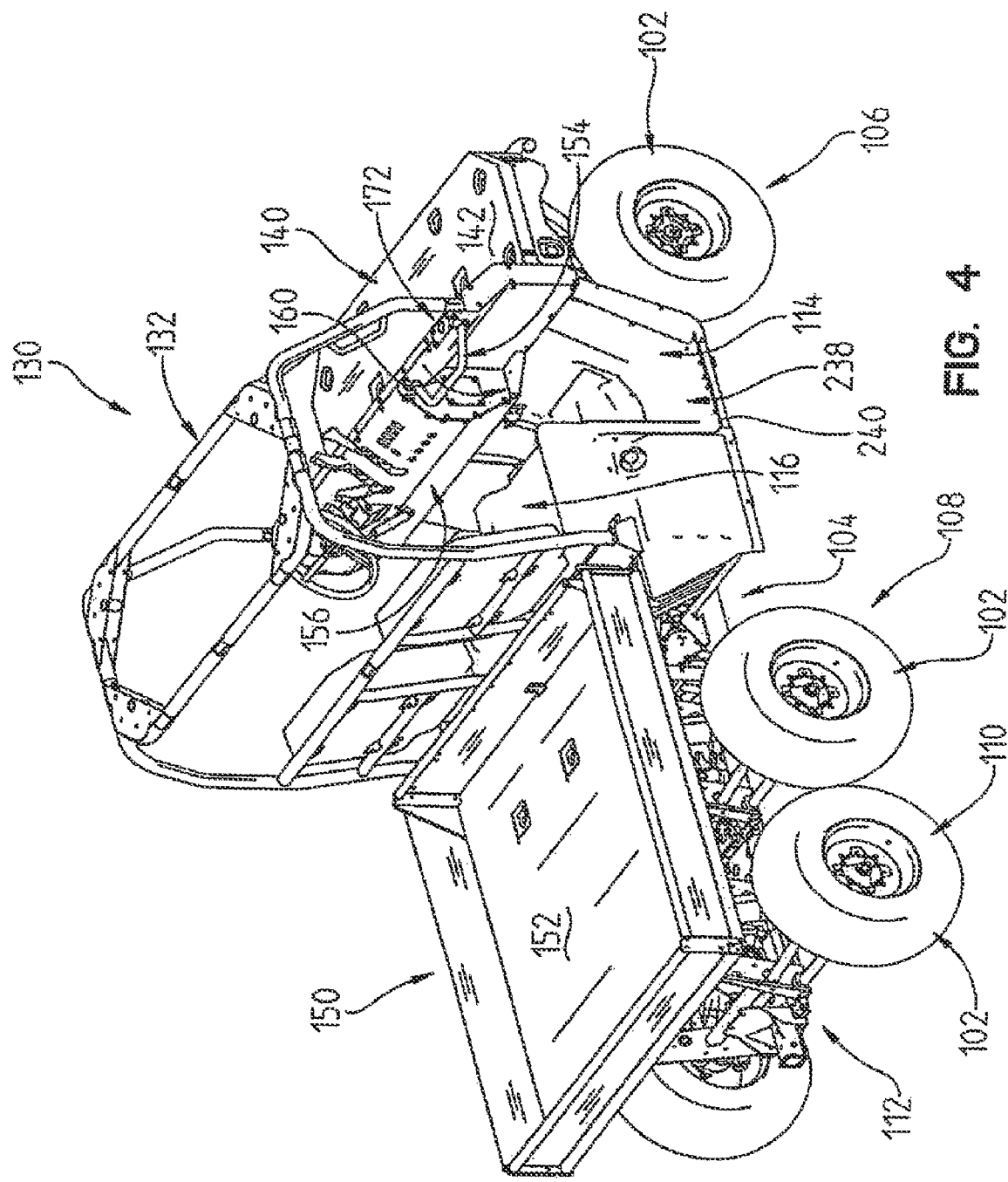
FIG. 4 is a rear, perspective view of the vehicle of FIG. 1 from a second side of the vehicle.
Figure 16:
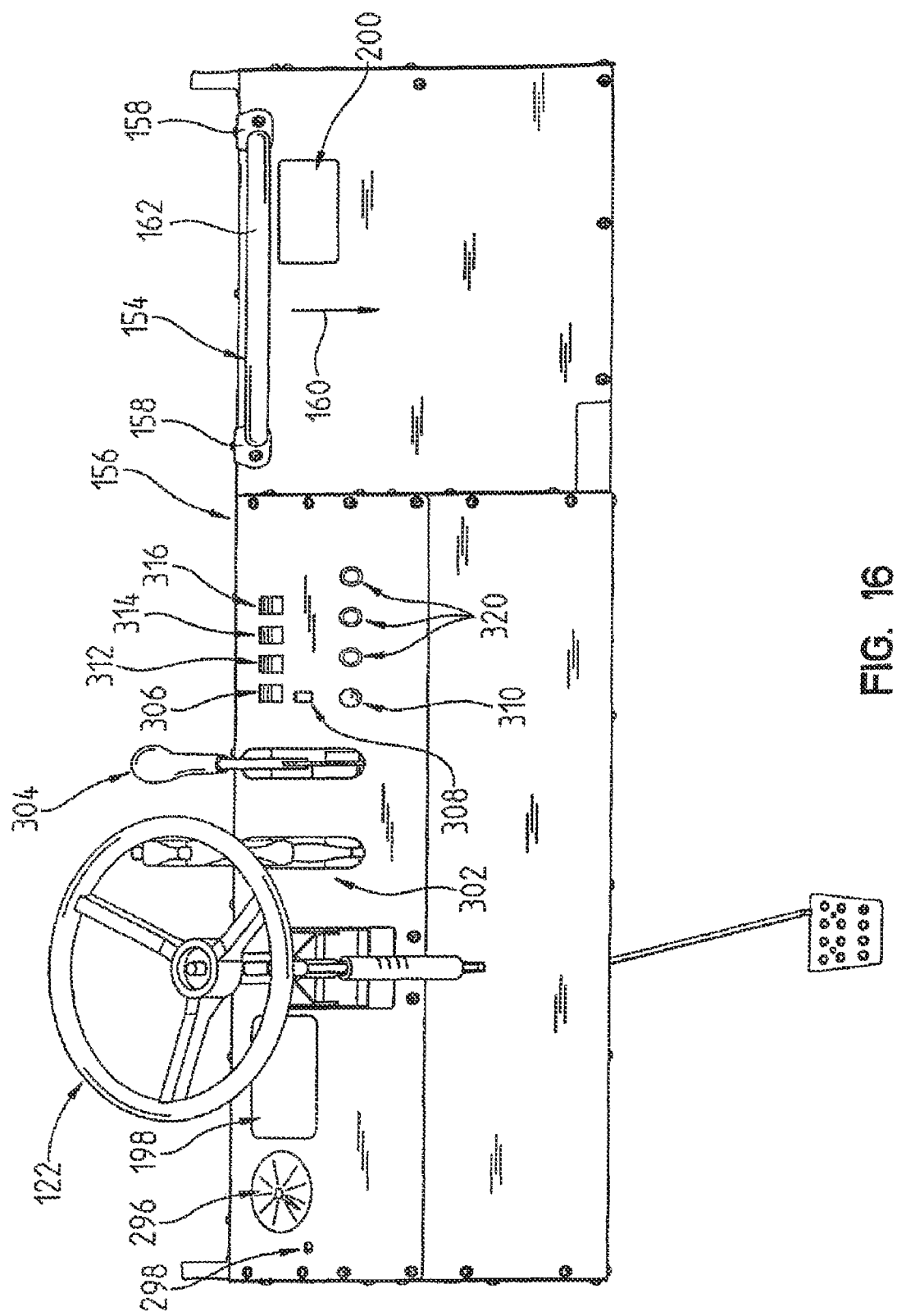
FIG. 16 is an elevation view of a dashboard of the vehicle of FIG. 1.

Further, portions of front platform 140 and rear platform 150, along with portion 130 of frame 104 may include devices for attaching various types of assets to vehicle 100. Exemplary assets including cargo containers, seats, gun mounts, footrests, and other suitable assets. Additional details regarding rear platform 150 are provided in U.S. Provisional Application Ser. No. 60/918,356, filed Mar. 16, 2007, titled "UTILITY VEHICLE HAVING MODULAR COMPONENTS", Several areas of vehicle 100 are designed to increase the ergonomics, safety, and/or ability to perform maintenance on vehicle 100. As best shown in FIG. 2, for improved visibility, front platform 140 is positioned below the top of dashboard 156, and as shown the front platform is about 10 inches below the top of dashboard 156. As shown in FIGS. 4 and 16, vehicle 100 includes a grab bar 154 mounted to dashboard 156. Grab bar 154 extends from dashboard 156 into operator area 114 so that a passenger can grasp grab bar 154 for stabilization. Grab bar 154 is rigidly mounted to dashboard 156 with a pair of brackets 158 fastened to grab bar 154 and dashboard 156.

According to an alternative embodiment of the present disclosure, grab bar 154 can be moved away from the passenger to provide addition clearance while entering and exiting vehicle 100. A hinge or pivot is provided between grab bar 154 and brackets 158 to permit grab bar 154 to rotate downward in direction 160. A detent or other latch (not shown) is provided to lock grab bar 154 in the raised position. Another latch (not shown) may also be provided to hold grab bar 154 in the lowered, stowed position.

According to another embodiment, grab bar 154 includes a plurality of telescoping members that extend and retract to permit a rearward-most portion 162 of grab bar 154 to move toward and away from dashboard 156. A spring detent (not shown) is positioned in an inner telescoping member and extends through an aperture therein. An outer telescoping member is provided with an aperture that receives a button of the spring detent. When received in the aperture, the outer telescoping member is locked in an extended position so that rearward-most portion 162 is closer to the passenger for grasping. To retract grab bar 154, the button is pushed inward so that it slips out of the aperture in the outer telescoping member and allows the inner and outer telescoping members to slide relative to one another. According to other embodiments, other mechanisms for stowing grab bar 154 are provided.

As shown in FIG. 2, steering wheel 122 can be titled in directions 164, 166 to provide additional clearance for a driver entering and exiting vehicle 100. A tilt mechanism 168 is provided between steering wheel 122 and frame 104 to permit movement in directions 164, 166. Additional details of tilt mechanism 168 and steering wheel 122 are provided in U.S. patent application Ser. No. 11/494,891, filed Jul. 28, 2006, titled "Side-by-side ATV," the disclosure of which is expressly incorporated by reference herein. As shown in FIG. 2, a pivot point 170 of tilt mechanism 168 is positioned rearward of dashboard 156. According to an alternative embodiment, pivot point 170 is lowered and moved forward so it is positioned within dashboard 156. According to an alternative embodiment of the present disclosure, a telescoping arrangement is provided that supports steering wheel 122 to permit the position of steering wheel 122 to be moved forward or backward.

Figure 8:
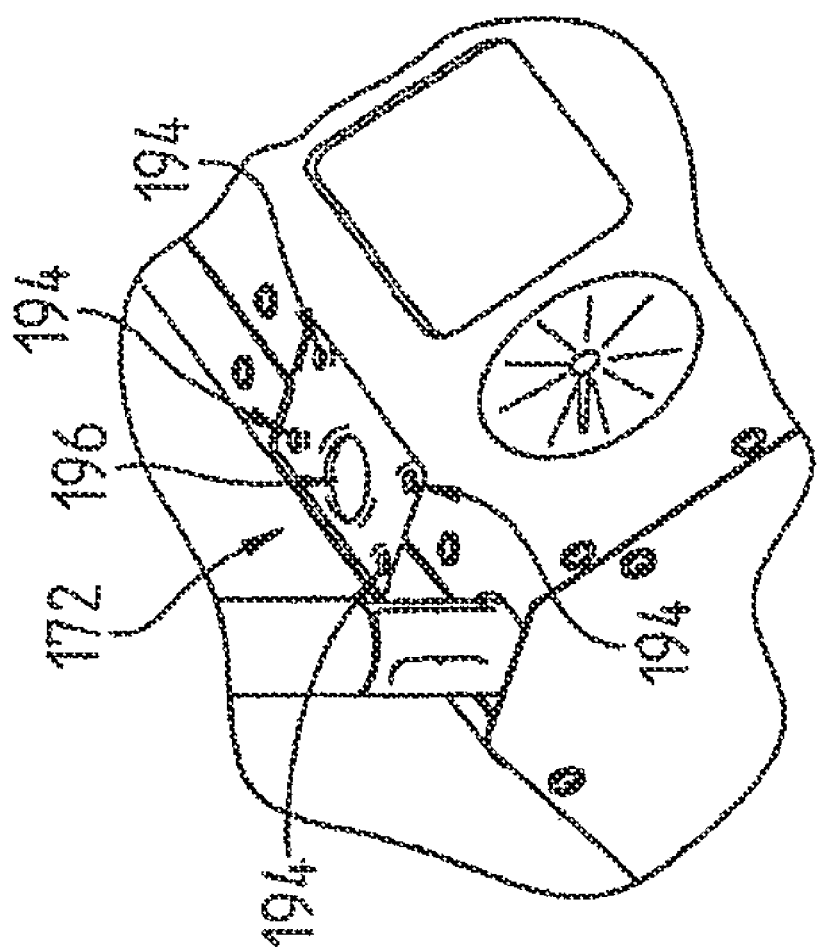
FIG. 8 is an enlarged perspective view of the a portion of the dashboard of the vehicle of FIG. 1.

As shown in FIGS. 1 and 4, frame 104 includes a pair of gun mounts 172 positioned on adjacent dashboard 156. Gun mounts 172 receive articulated or other gun support 174 (shown in phantom in FIG. 13). Gun support 174 includes a first arm 176 pivotably mounted to gun mount 172 to permit rotation in directions 178, 180 and a second arm 182 pivotably mounted to first arm 176 to permit rotation in directions 184, 186. Preferably, second arm 182 is positioned above first arm 176 so that second arm 182 can rotate over first arm 176. A machine gun 188 (shown in phantom in FIG. 13) is pivotably mounted to second arm 182 to permit rotation in directions 190, 192. Preferably, machine gun 188 is positioned above second arm 182 so that machine gun 188 can rotate over second arm 182. As shown in FIG. 8, gun mounts 172 include four bolt-receiving apertures 194 and a shaft-receiving bore 196. Gun support 174 includes a mounting bracket (not shown) with a bolt pattern that matches bolt-receiving apertures 194 of gun mounts 172. Gun support 174 further includes a shaft (not shown) that extends through shaft-receiving bore 196. As shown in FIG. 16, dashboard 156 includes a pair of apertures 198, 200 that permit access to an underside of gun mounts 172 through dashboard 156. Apertures 198, 200 may be covered with removable panels or doors (not shown).

Figure 9:
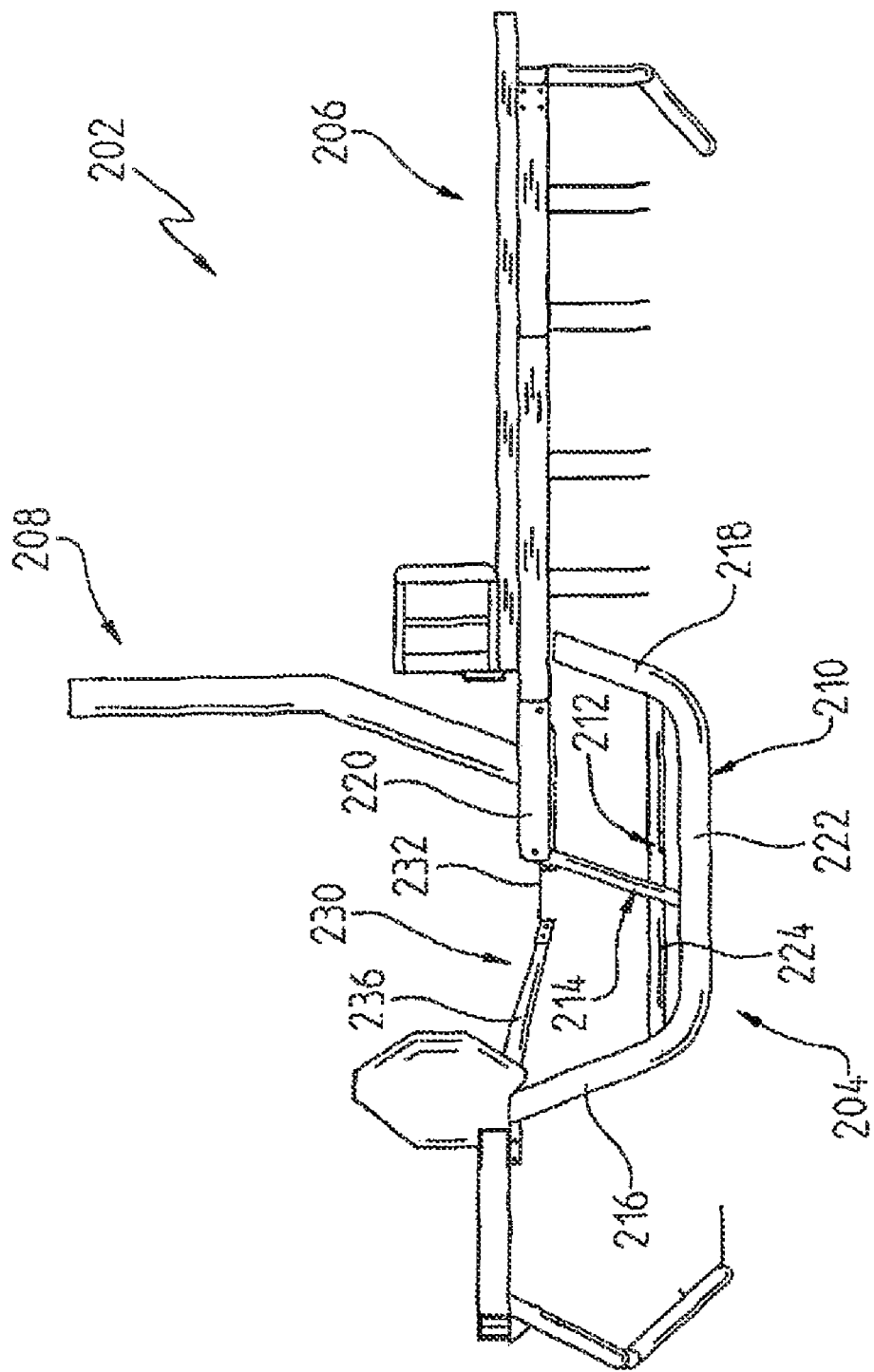
FIG. 9 is a side elevation view of an alternative frame for the vehicle of FIG. 1.
Figure 10:
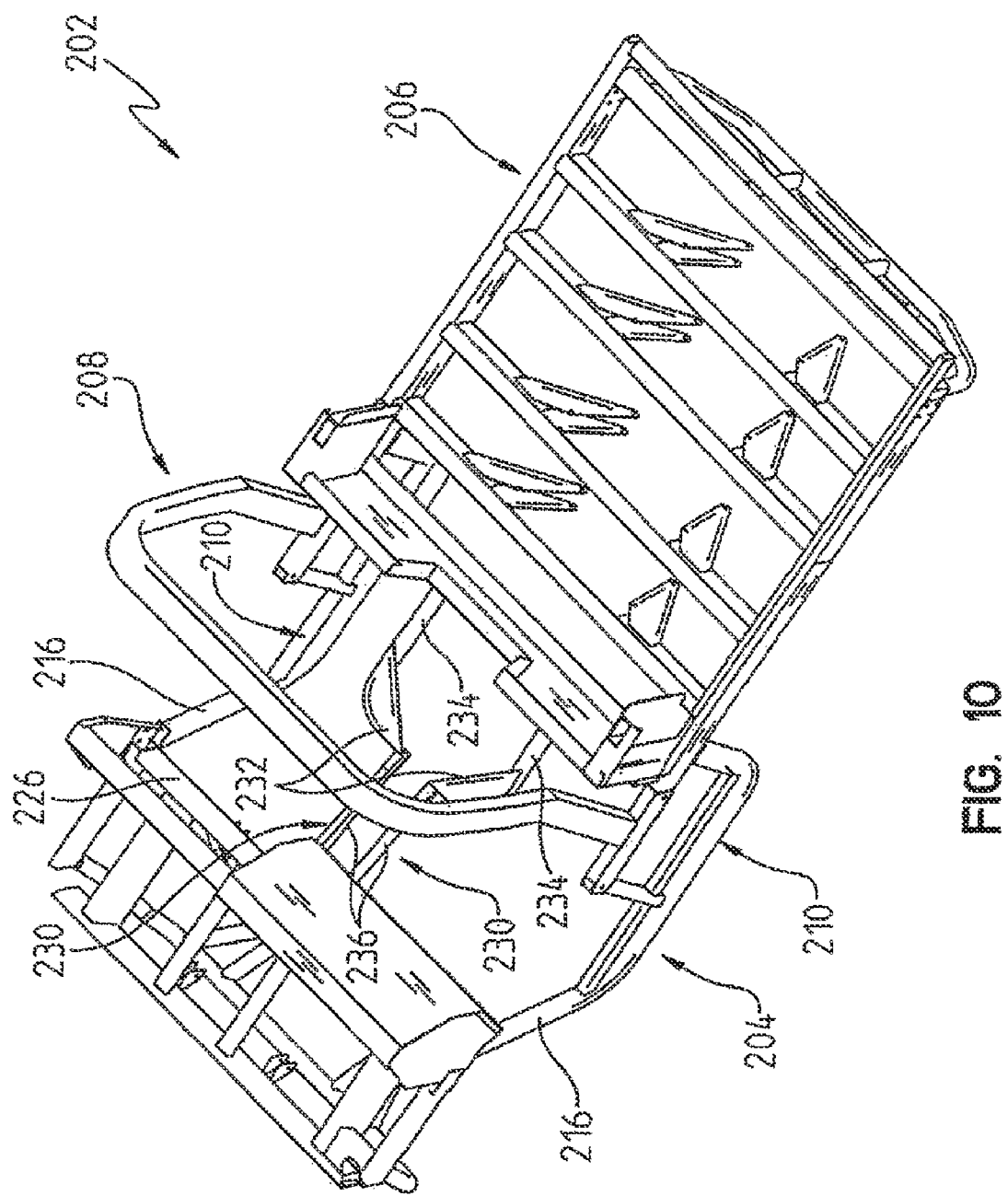
FIG. 10 is a perspective view of the frame of FIG. 9.

According to an alternative embodiment of the present disclosure, an exoskeletal frame 202 (shown in FIGS. 9-11) is provided that is supported on frame 104. Frame 202 includes a lower occupant cage 204, a rear platform support 206 coupled to occupant cage 204, and a roll bar 208 coupled to rear platform support 206. Lower occupant cage 204 includes a lower U-shaped member 210 and first and second cross members 212, 214. As shown in FIG. 9, first cross member 212 extends between legs 216, 218 of U-shaped member and second cross member 214 extends from a forward end 220 of platform support 206 to a bottom portion 222 of U-shaped member 210. Relative to the occupants, second cross member 214 is positioned behind the occupants' calves. Seating 116 is positioned above forward end 220 of platform support 206. The floor board follows first leg 216 and bottom portion 222 of U-shaped member 210. As shown in FIG. 9, first cross member 212 is elevated above the floor board and blocks the occupant's feet from leaving the operator area. First cross member 212 may be raised or lowered from the position shown in FIG. 9 to provide more or less blocking.

According to one embodiment, a forward portion(s) 224 of first cross member(s) 212 is removable from frame 202 to facilitate egress of the driver and passenger. According to one embodiment, one end of forward portion 224 is pivotably connected to the respective frame member and the other end latches to the respective frame member. According to another embodiment, fasteners are provided at each end of forward portion 224 to permit removal.

Figure 11:
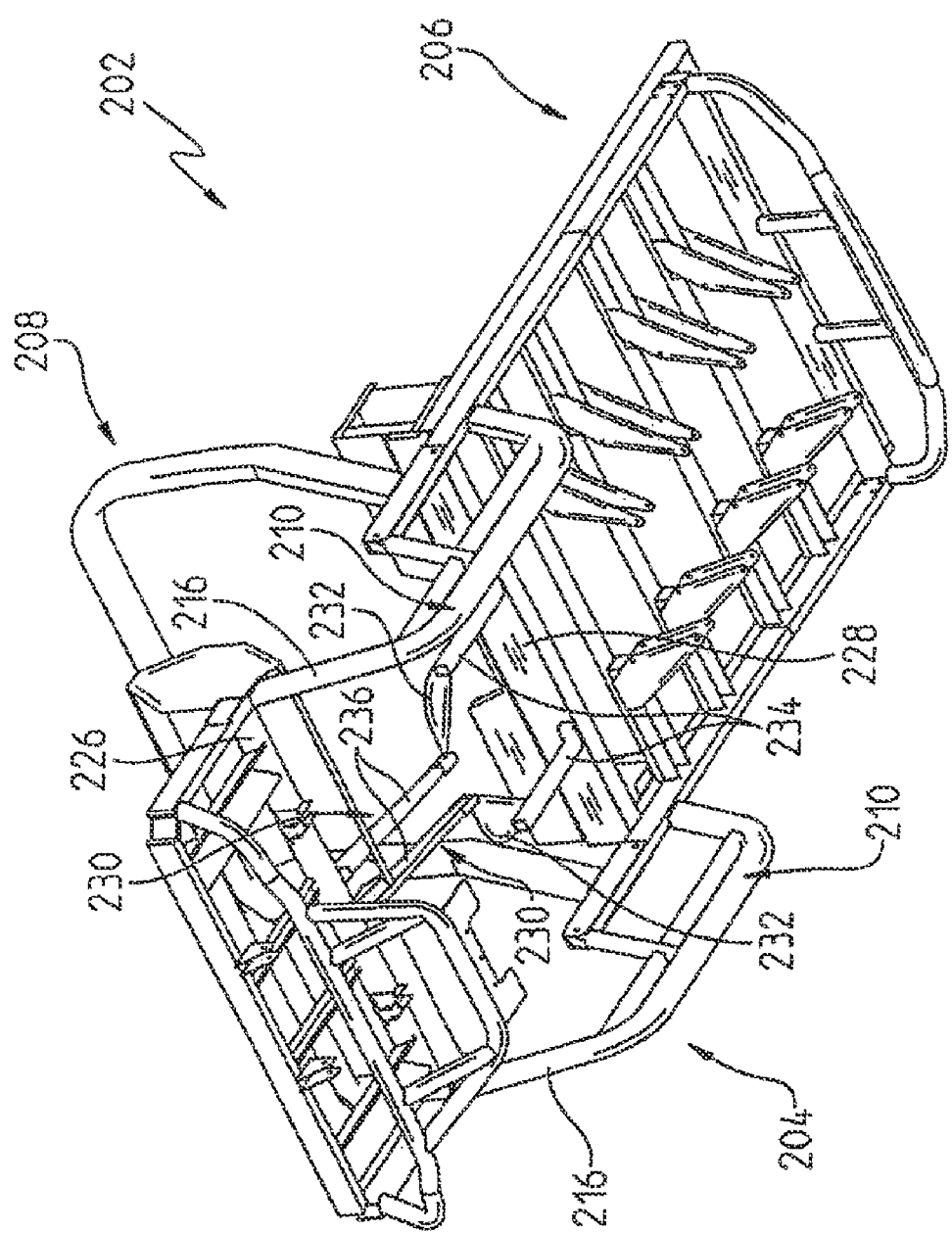
FIG. 11 is another perspective view of the frame of FIG. 9.

As shown in FIG. 11, frame 202 includes a first transverse member 226 extending between upper ends of first legs 216 of U-shaped member 210 and a second transverse member 228 extending between forward ends 220 of platform support 206. While driving over rough terrain, the upper ends of first and second legs 216, 218 of U-shaped member 210 will move toward each other when either or both of front wheels 102 hit an object. To provide additional rigidity to lower occupant cage 204, one or more frame members 230 are provided that extends from first transverse member 226 to second transverse member 228. Frame members 230 also increase the rigidity of frame 104. Frame members 230 include a pair of plates 232 and tubular members 234 that support seating 116. The engine may be positioned laterally between tubular members 234 at a lower elevation so that upper portions of the engine are positioned directly between tubular members 234. A parking brake (not shown) and other controls may be positioned between forward tubular members 236 of frame members 230. The features of exoskeletal frame 202 may also be provided directly on frame 104. According to one embodiment, forward tubular members 236 may be removed. For example, tubular members 236 may be fastened with removable pins, latches, or removable fasteners to facilitate removal.

As shown in FIGS. 1, 2 and 4, floorboard 238 is positioned on lower frame member 240 of frame 104 when exoskeletal frame 202 is not provided. Floorboard 238 protects occupants in vehicle 100 from debris kicked up during driving. Floorboard 238 is preferably vacuum-formed and made of Kevlar-brand material. Other ballistic resistant materials may also be used for floorboard 238 including ceramic cores backed with a high performance composite layered fiber and other ballistic resistant materials known to those of ordinary skill in the art. As shown in FIG. 2, floorboard 238 includes an outer lip 242 that rest on top of lower frame member 240. Floorboard 238 further includes a pocket 244 that extends forward of lower frame member 240 and provides additional room for the occupants feet.

Figure 12:
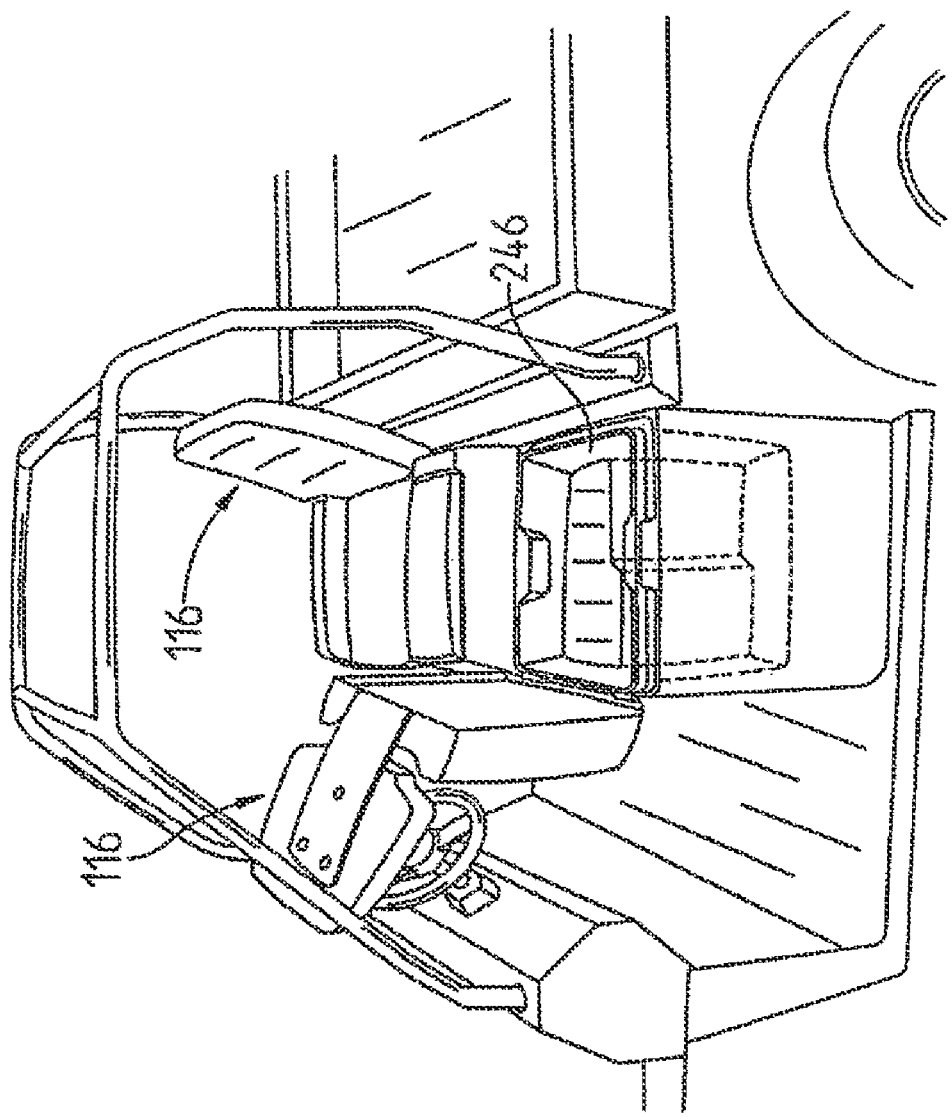
FIG. 12 is a perspective view of an alternative embodiment seating and access arrangement for the vehicle of FIG. 1.
Figure 13:
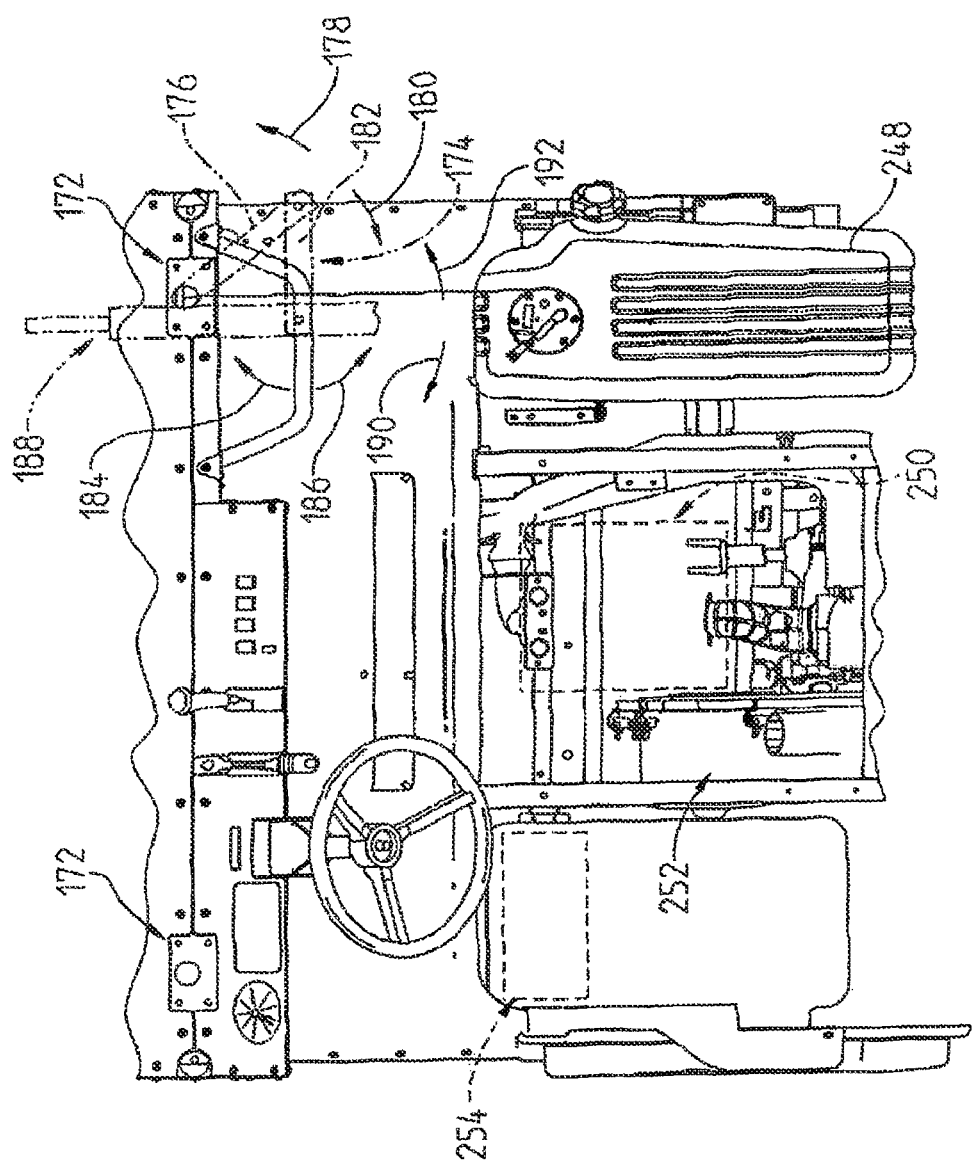
FIG. 13 is a top plan view of the operator area of the vehicle of FIG. 1 showing the seating removed.

Vehicle 100 includes several features that facilitate access to various components. For example, according to one embodiment, seating 116 rotates forward to provide access to components below seating 116, as shown in FIG. 12. In one embodiment, trays 246 are provided under seating 116 that provide storage. According to another embodiment, trays 246 are not provided and vehicle components, such as the engine are accessible directly under seating 116. According to another embodiment, trays 246 are contoured to fit around components positioned directly under seating 116. When seating 116 is rotated forward and the respective trays 246, if provided, are removed, maintenance can be performed on several components, as shown in FIG. 13. For example, when the passenger's portion of seating 116 is raised, gas tank 248 and portions of engine 250 (shown in phantom) are accessible. When the driver's portion of seating 116 is raised, other portions of engine 250, a continuously variable transmission (CVT) 252, and battery 254 (shown in phantom) are accessible. Additional components may also be positioned under seating 116 including an electrical converter, electronic control module, battery charger, and other components. The electrical converter (not shown) may be used to convert DC or other power from another vehicle for use with vehicle 100. For example, if another vehicle operates on 24 volts, the converter can be used by vehicle 100 to convert the 24 volt power supplied by the other vehicle to 12 volts for use by vehicle 100 to charge battery 254 or provide for engine start up. Vehicle 100 may also be provided with a 12 volt-to-24 volt electrical converter to permit vehicle 100 to charge the battery of a 24 volt vehicle or provide for engine start up of the 24 volt vehicle.

Figure 14:
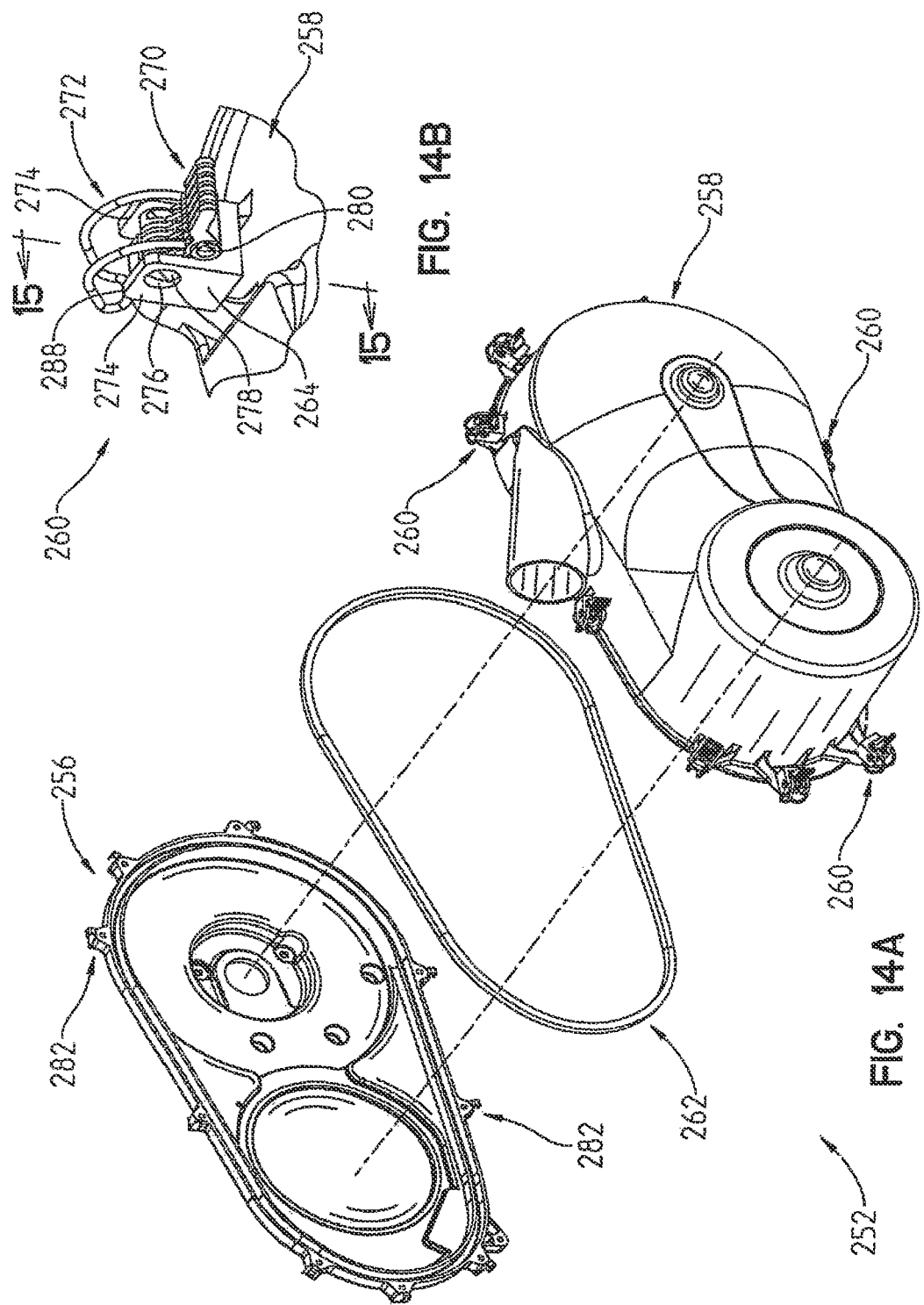
FIG. 14A is a perspective, assembly view of a housing assembly for a continuously variable transmission (CVT) of the vehicle of FIG. 1.
FIG. 14B is an enlarged view of a portion of FIG. 14A.

As shown in FIG. 14A, CVT 252 includes first and second housings 256, 258. CVT 252 further includes a plurality of latches 260 that couple first and second housings 256, 258 together. A seal or gasket 262 is positioned between housings 256, 258 to form a substantially air-tight seal therebetween. Additional details of a suitable CVT are provided in U.S. Pat. No. 6,149,540, filed Sep. 17, 1997, titled "Continuously Variable Transmission System with Engine Braking," the disclosure of which is expressly incorporated by reference herein.

Figure 15:
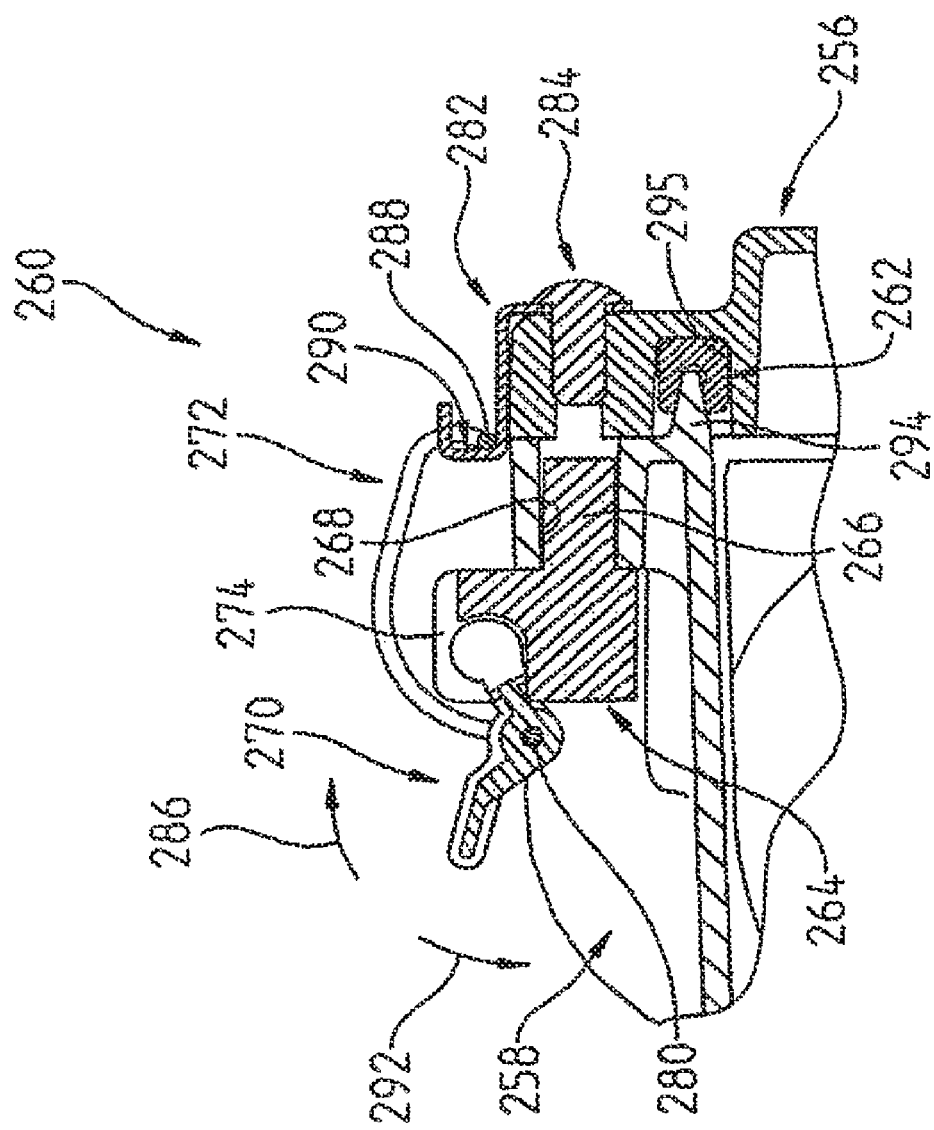
FIG. 15 is a cross-sectional view of a fastener of the CVT housing taken along line 15-15 of FIG. 14B.

As shown in FIG. 15, each latch 260 includes a base member 264 having a post 266 that is received in one of bores 268 formed in second housing, 258. According to one embodiment, posts 266 are cylindrical and bores 268 are also cylindrical. According to other embodiments, the posts and bores are other complementary shapes. Latch 260 further includes a lever 270 pivotably coupled to base member 264 and a wire clip 272 pivotally coupled to lever 270.

As shown in FIG. 14B, base member 264 includes a pair of uprights 274 having post-receiving bores 276. Each lever 270 includes a pair of corresponding posts 278 that are received in bores 276 to permit pivoting of lever relative to base member 264. Opposite ends of wire clips 272 are received within a bore 280 extending through lever 270.

As shown in FIG. 15, latch 260 further includes a hook member 282 coupled to first housing 256 by a fastener 284. To release latch 260, lever 270 is rotated in direction 286 so that a middle portion 288 of wire clip 272 is no longer positioned within the recess 290 of hook member 282. To couple housings 256, 258 together, middle portion 288 is positioned in front of recess 290 and lever 270 is rotated in direction 292. During rotation, middle portion 288 moves into recess 290 and lever 270 moves to an over center position. Because clip 272 is made of wire, it will flex slightly during this movement to provide a slightly compliant member. Also during this movement, a rib 294 on second housing 258 compresses seal 262 that is positioned in a groove 295 in first housing 256 as shown in FIG. 15.

Latches 260 may also be used in other vehicles, such as ATV, snowmobiles, and other vehicles with CVTs. Latches 260 may also be used in retrofit applications for existing CVTs on such vehicles. For example, some CVTs have housings similar or identical to housings 256, 258. These housings are coupled together with a bolt or other fastener that is longer than fastener 284 and extends through bore 268. A nut or other fastener is provided on second housing 258 to couple to this longer bolt (not shown). In a retrofit application, this longer bolt and nut are removed from respective housings 256, 258. Hook member 282 is then attached to first housing 256 with fastener 284 and post 266 of base member 264 is placed in bore 268. This process continues until the desired number of bolts is replaced. Several components of latches 260 may also be integrated into housings 256, 258. For example, base member 264 may be molded into housing 258 and hook member 282 may be molded into housing 256.

As shown in FIG. 16, dashboard 156 includes several controls 120 and instruments. From left to right, dashboard 156 includes a speedometer mode switch 298, a speedometer 296, an access aperture 198, steering wheel 122, brake lever 302, high, low, neutral, park, and reverse shift lever 304, wheel drive switch 306, active-descent-control (ADC) switch 308, ignition switch 310, visible light switch 312, IR light switch 314, blackout switch 316, and a plurality of 12 volt power outlets 320. Ignition switch 310 is preferably a toggle switch that does not require a key to start the engine.

Speedometer 296 displays vehicle speed and various distance and operational indicators. Speedometer 296 includes a plurality of modes controlled by speedometer mode switch 298. These modes may include a vehicle odometer reading, multiple trip indicators, a vehicle hour meter, a trip hour meter, and other operational values of the vehicle, such as oil pressure, fuel level, and other operational values. When pressed, mode switch 298 activates a menu displayed on speedometer 296. Each time mode switch 298 is pressed, it switches to a different mode. For example, when pressed the first time, a first trip indicator is displayed. If the operator repeatedly presses mode switch 298, it will scroll through the various modes and display the information associated with the mode. Some modes can be reset. For example, if the operator holds mode switch 298 for a predetermined time, such as three seconds, while displaying the first trip indicator, such as three seconds, the first trip indicator resets.

To switch the vehicle brake between the parked and released positions, the operator moves brake lever 302. To switch between high gear, low gear, reverse, and park, the driver moves shift lever 304 up and down to the appropriate position.

Headlights 324 and other light sources on vehicle 100 emit visible light. To turn headlights 324 on and off, the driver operates visible light switch 312 between high beam, low beam, or off. Vehicle 100 is also provided with IR headlights (not shown) and other IR emitting lights that permit an operator wearing night vision goggles to see when it is dark. Normally, when the IR lights are running, the visible lights, such as headlights 324, are turned off to avoid detection. To turn the IR lights on and off, the driver operates IR light switch 312. In some circumstances, it is desirable to operate vehicle 100 without any lights (visible or IR). In these circumstances, the driver operates blackout switch 316 that turns both the visible and IR lights off. Additional details of a light system having both visible and IR lights is provided in U.S. Pat. No. 7,125, 134, to Hedlund et al., filed Oct. 15, 2003, titled "Switch Enabled Infrared Lighting System With Non-IR Light Elimination," the disclosure of which is expressly incorporated by reference herein.

According to another embodiment, a blackout drive switch (not shown) is provided on dashboard 156 to turn a blackout drive mode on and off. When in blackout drive mode, visible light sources are turned off and most IR light sources are turned off including any main IR headlights, main IR brake lights, main IR tail lights, etc. Only small IR lights that emit IR light a relatively short distance are lit so that others with IR goggles in relative close proximity to vehicle 100 may see the small IR lights. Such small IR lights may be positioned on the outer corners of vehicle 100 or in the headlights, brake lights, tail lights, etc.

The drive characteristics of vehicle 100, can be altered with wheel drive switch 306 and ADC switch 308. The driver uses wheel drive switch 306 to toggle between two-wheel drive, two wheel drive with a locked differential, and all wheel drive. The driver uses ADC switch 308 to turn all drive control on and off. Additional details of the various transmission modes of vehicle 100 are provided in U.S. Provisional Application Ser. No. 60/918,502, filed Mar. 16, 2007, titled "VEHICLE,"

Vehicle 100 is provided with several power supply features. For example, engine 250 may be provided with a built-in inverter that supplies AC power. AC power outlets may be provided at various locations on vehicle 100 including on dashboard 156, on engine 250, or in any accessible location on vehicle 100. Additional details of a suitable inverter are provided in U.S. patent application Ser. No. 11/263,695, filed Nov. 1, 2005, titled "MOBILE INVERTER GENERATOR," the disclosure of which is expressly incorporated by reference herein. According to another embodiment, engine 250 may be provided with a starter generator that provides electrical power. Additional details of a suitable starter generator are provided in U.S. patent application Ser. No. 11/283,016, filed Nov. 18, 2005, titled "STARTER GENERATOR," the disclosure of which is expressly incorporated by reference herein. AC power may be provided directly from the windings of the inverter or starter generator or otherwise conditioned to provide the appropriate waveform and voltage, such as 110V 60 Hz. AC power may also be provided from 254 through a conventional DC-to-AC inverter (not shown). Engine 250 may also be provided with a 700 watt (or other wattage) stator.

A rectifier 326 (shown in FIG. 5) receives AC power from the windings of the inverter (or starter generator or stator) and provides DC power to battery 254, which distributes DC power to the other DC components of vehicle 100. A power control (not shown) regulates how and when various electrical components receive power from battery 254 or indirectly from engine 250. The power control is configured to regulate the available energy stored in battery 254 so that battery 254 maintains its charge and/or engine 250 provide sufficient power.

For example, when engine 250 is running and is used to provide auxiliary power to DC power outlets 320 and/or the AC power outlets, the power control regulates the speed of engine 250 so that the electrical generator (inverter, starter generator, etc.) provides enough power to maintain the charge of battery 254 and provides sufficient power for the AC components. As the auxiliary power draw increase, the speed of engine 250 increases. When providing this function, vehicle 100 is normally parked with the vehicle transmission in neutral. However, auxiliary power may also be provided when vehicle 100 is operating.

In another example, the power control monitors the voltage level of battery 254 when engine 250 is not running and maintains the voltage level at a predetermined minimum, such as 11.5 volts. If engine 250 is not running, the power control will shut off power to the auxiliary outputs when the battery voltage drops to 11.5 volts to ensure that enough power is available to start engine 250. In one embodiment, if the voltage of battery 254 drops below the predetermined level, the power control will automatically start engine 250 to recharge battery 254. This feature may be disabled in situations where the operators do not want engine 250 to automatically start, such as during covert operations.

Figure 5:
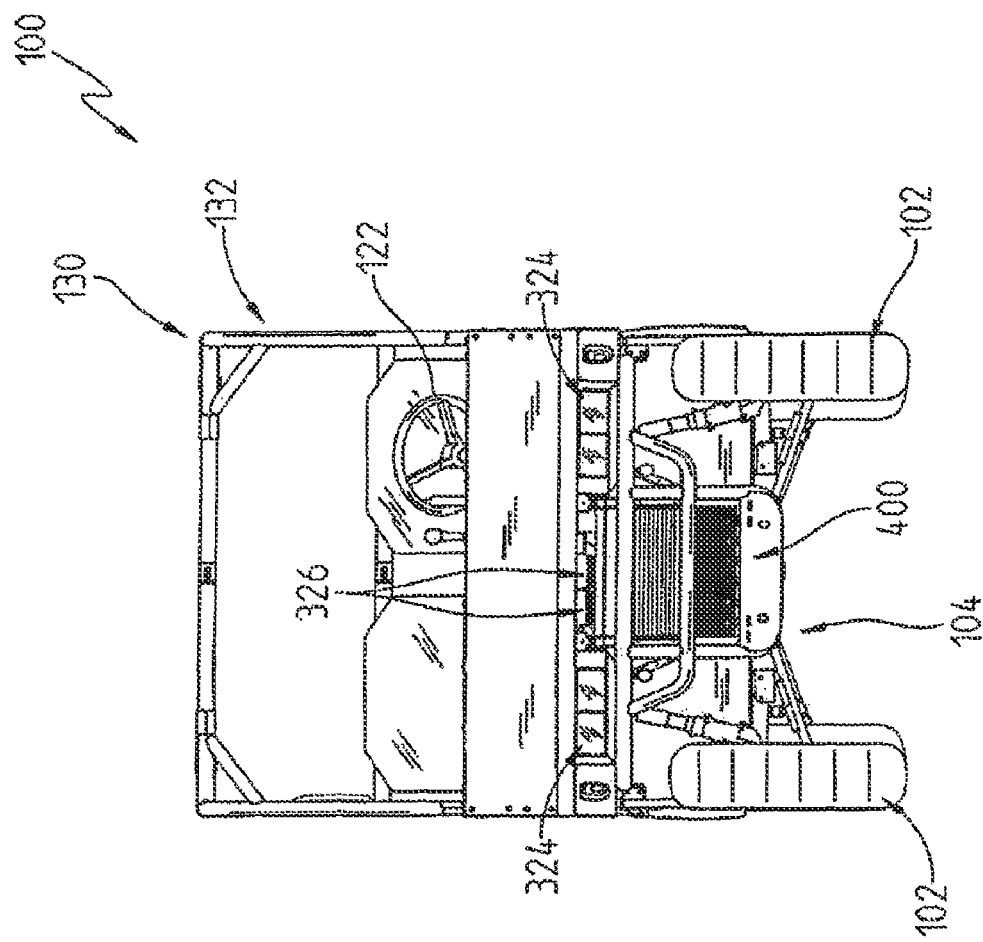
FIG. 5 is a front view of the vehicle of FIG. 1.
Figure 6:
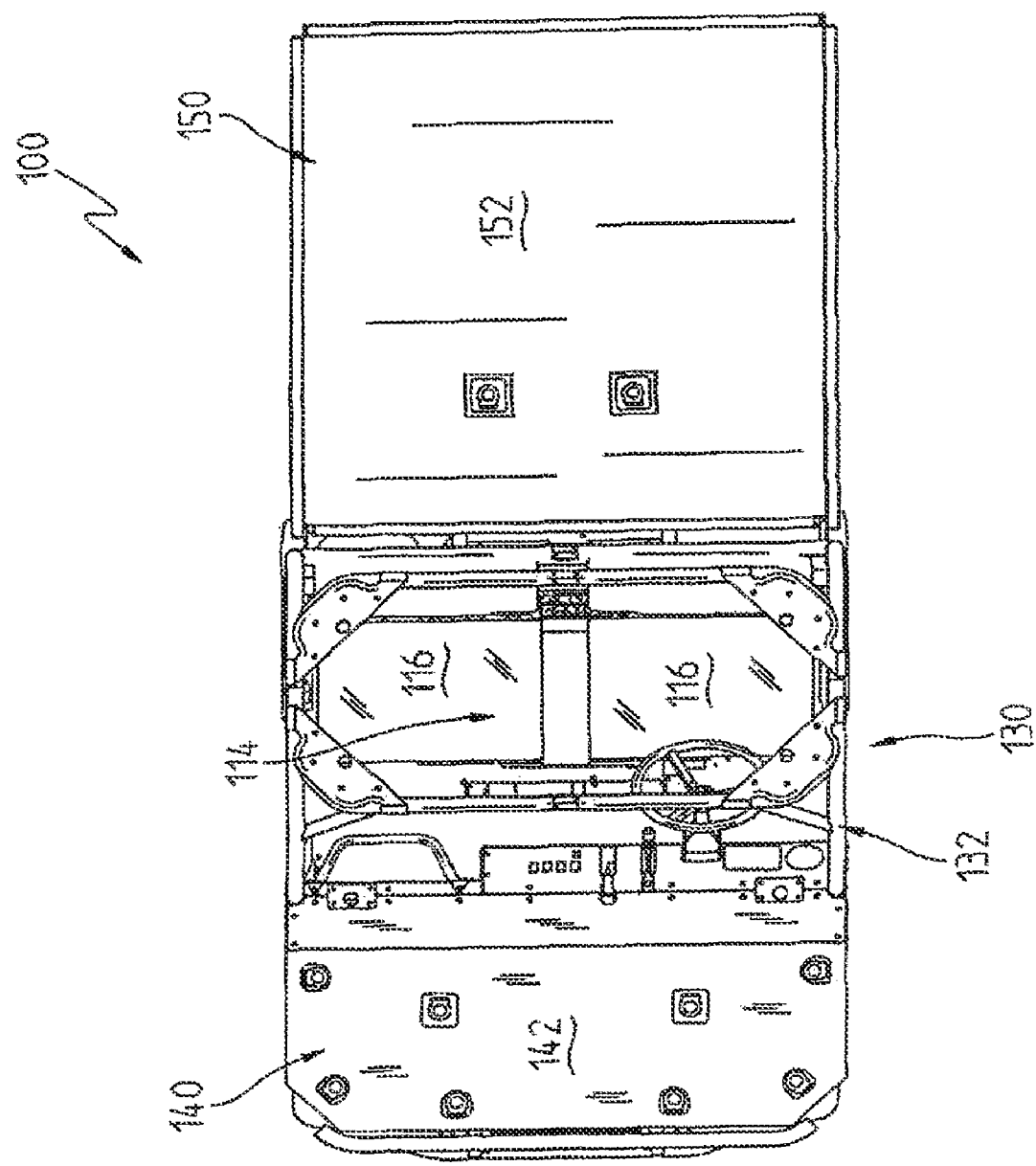
FIG. 6 is a top view of the vehicle of FIG. 1.
Figure 7:
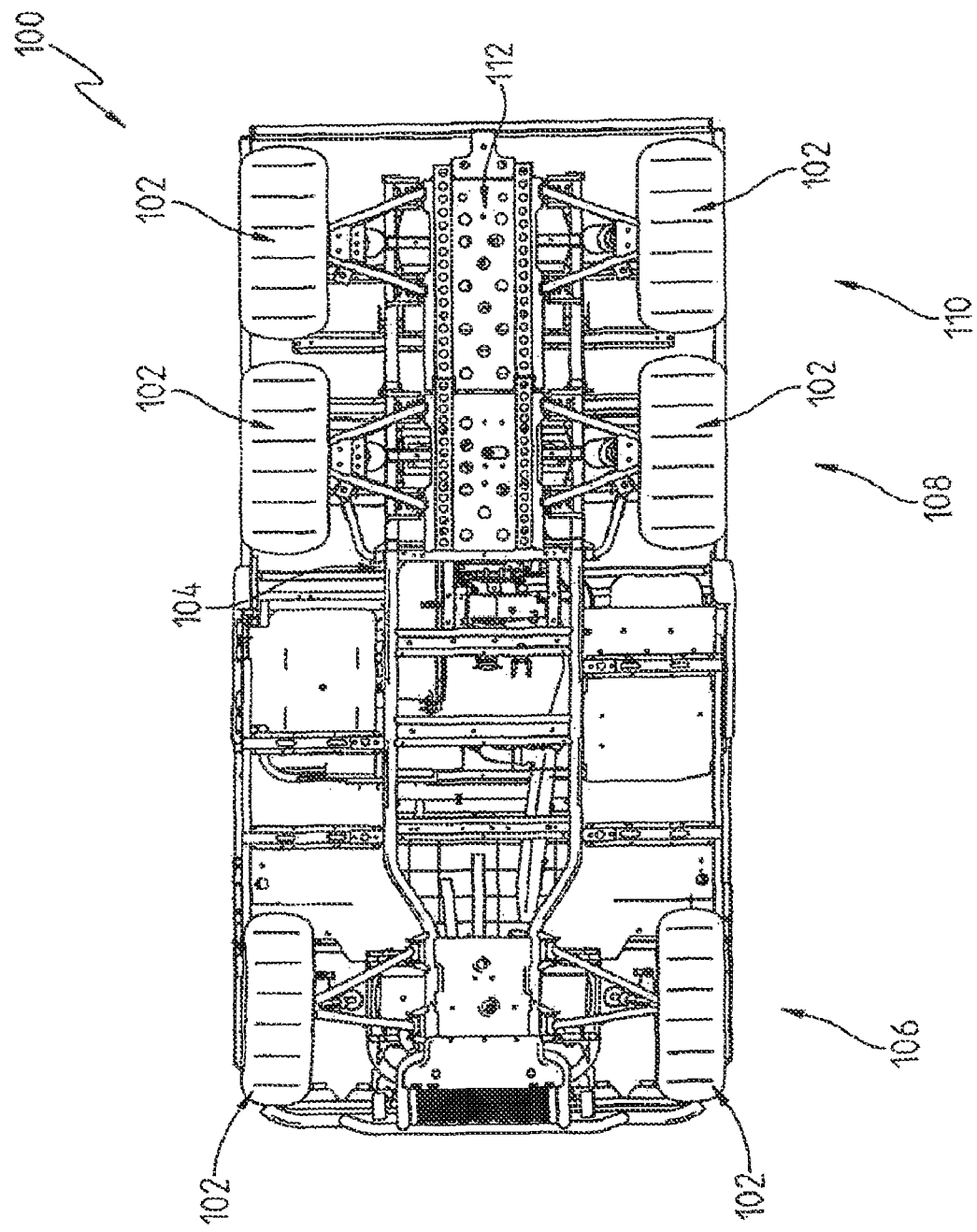
FIG. 7 is a bottom view of the vehicle FIG. 1.
Figure 17:
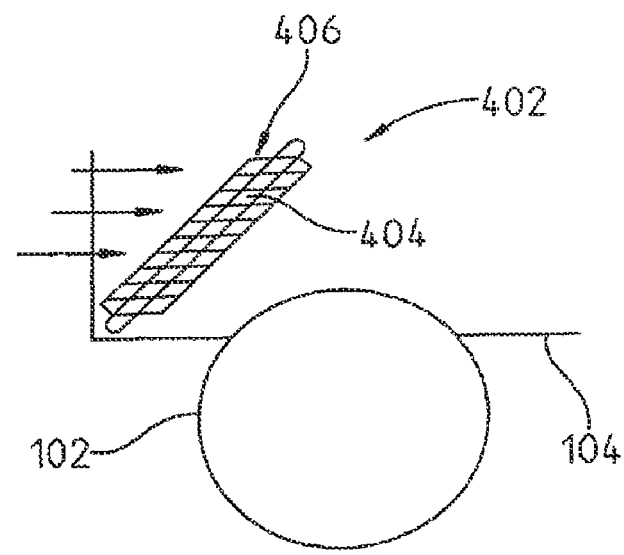
FIG. 17 is a side view of an alternative embodiment radiator for the vehicle of FIG. 1.
Figure 18:
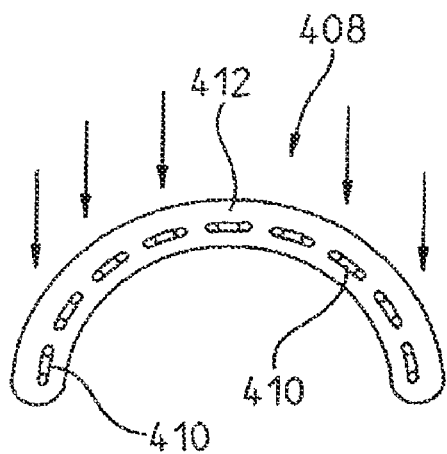
FIG. 18 is a top plan view of another alternative embodiment radiator for the vehicle of FIG. 1.
Figure 19:
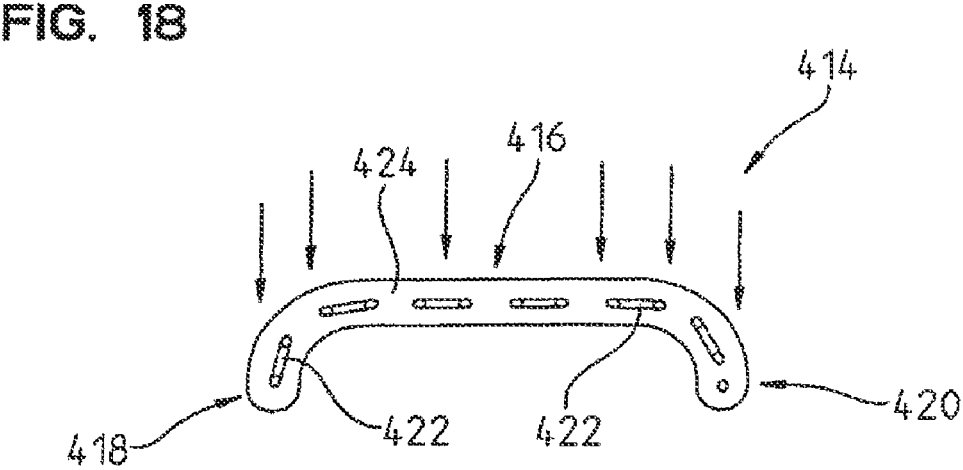
FIG. 19 is a top plan view of another alternative embodiment radiator for the vehicle of FIG. 1.

As shown in FIGS. 5 and 17-19, vehicle 100 may be provided with various radiator configurations. Radiator 400, shown in FIG. 5, is substantially rectangular with substantially vertical coolant tubes and substantially horizontal cooling fins coupled to the coolant tubes. Radiator 402, shown in FIG. 17, is substantially rectangular with angled coolant tubes 404 and substantially horizontal cooling fins 406. Coolant tubes 404 cooperate with the ground to define an angle of about 45 degrees. Similarly, cooling fins 406 cooperate with coolant tubes 404 to define an angle of about 45 degrees. Radiator 408 has an arcuate profile as shown in FIG. 18. Coolant tubes 410 are substantially vertical and cooling fins 412 are substantially horizontal. Radiator 414 has a profile with a substantially flat mid section 416 and rounded end sections 418, 420. Coolant tubes 422 are substantially vertical and cooling fins 424 are substantially horizontal.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A utility vehicle comprising:
a main frame;
a plurality of ground engaging members adapted to support the main frame above the ground;
seating having a seating surface and being supported by the main frame;
an engine supported by the main frame;
a floor supported by the main frame and located forward of the seating;
a dashboard spaced apart from the seating, the seating, the floor, and the dashboard cooperating to define an operator space extending above the floor and the seating;
a restrictor member configured to selectively restrict an operator's feet from leaving the operator space, the restrictor member being supported by the main frame and having its uppermost portion located below the seating surface; and
a U-shaped member having a middle portion coupled to the floor and a support member extending generally upwardly from the middle portion of the U-shaped member, wherein the restrictor member is coupled to the support member.

2. A vehicle as in claim 1, wherein the restrictor member is pivotable and may be lowered to allow the operator's feet to leave the operator space.

3. A vehicle as in claim 1, wherein the restrictor member is detachable and may be detached to allow the operator's feet to leave the operator space.

4. A vehicle as in claim 1, further comprising an exoskeletal frame supported by the main frame, wherein the restrictor member is supported by the exoskeletal frame.

5. A vehicle as in claim 1, wherein the restrictor member is pivotably coupled to the support member and may be lowered to allow the operator's feet to leave the operator space.

6. A vehicle as in claim 1, wherein the restrictor member is detachably coupled to the support member and may be detached to allow the operator's feet to leave the operator space.

7. A vehicle as in claim 1, wherein the restrictor member reduces deflection of the main frame about the floor.

8. A utility vehicle comprising:
a main frame;
a plurality of ground engaging members adapted to support the main frame above the ground;
seating having a seating surface and being supported by the main frame;
an engine supported by the main frame;
a floor supported by the main frame and located forward of the seating;
a dashboard spaced apart from the seating, the seating, the floor, and the dashboard cooperating to define an operator space extending above the floor and the seating; and
a restrictor member configured to selectively restrict an operator's feet from leaving the operator space, the restrictor member being supported by the main frame and having its uppermost portion located below the seating surface, wherein the plurality of ground engaging members include a plurality of front ground engaging members supporting the frame above the ground and a plurality of rear ground engaging members positioned rearward of the front ground engaging members and supporting the frame above the ground; wherein the dashboard includes a top surface; and the utility vehicle further comprising a cargo platform having upper and lower surfaces, the cargo platform being positioned forward of the dashboard and at least partially between the front ground engaging members, the upper surface being positioned below the top surface of the dashboard, and the cargo platform being normally exposed; and a radiator supported by the frame and positioned below the lower surface of the cargo platform.

9. The utility vehicle of claim 8, further comprising an accessory mount including a shaft and a first arm, the shaft being coupled to the dashboard and being supported by the frame, the first arm being coupled to the shaft on one end and adapted to support an accessory on the opposite end, and the first arm rotating about the shaft.

10. A utility vehicle comprising:
a frame;
a plurality of ground engaging members adapted to support the frame above the ground;
side-by-side seating supported by the frame, at least two front grounding engaging members being positioned forward of the side-by-side seating and at least two rear ground engaging members being positioned rearward of the side-by-side seating;
a plurality of front independent suspensions coupling the at least two front ground engaging members to the frame;
a plurality of rear independent suspensions coupling the at least two rear ground engaging members to the frame;
a floor supported by the frame and located forward of the side-by-side seating;
a dashboard spaced apart from the side-by-side seating, the side-by-side seating, the floor, and the dashboard cooperating to define an operator space extending above the floor, the operator space having a leftside opening and a rightside opening each of which permits ingress and egress relative to the operator space;
an engine supported by the frame, the engine being positioned completely rearward of the dashboard;
a CVT unit operatively coupled to the engine and operatively coupled to at least a first forward ground engaging member and at least a first rear ground engaging member;
a cargo bed supported by the frame and positioned rearward of the side-by-side-seating;
a U-shaped frame member supported by the frame, the U-shaped frame member bounding a lower portion of the leftside opening of the operator space and including a front rearwardly angled member, a rear forwardly angled member, and a lower member extending between the front rearwardly angled member and the rear forwardly angled member; and
a restrictor member supported by the frame and extending between the front rearwardly angled member of the U-shaped frame member and the rear forwardly angled member of the U-shaped frame member, an upper edge of the restrictor member being spaced apart from the lower member of the U-shaped frame member, wherein the restrictor member is positioned to block a foot of the operator from leaving the operator space.

11. The utility vehicle of claim 10, wherein the restrictor member is moveable relative to the U-shaped frame member.

12. The utility vehicle of claim 11, wherein a first portion of the restrictor member laterally aligned with the side-by-side seating is completely below a seating surface of the side-by-side seating.

13. The utility vehicle of claim 12, wherein the first portion of the restrictor member is completely below the side-by-side seating.

14. The utility vehicle of claim 12, wherein the restrictor member is completely below the side-by-side seating.

15. The utility vehicle of claim 10, wherein the restrictor member is completely below a steering wheel positioned in the operator space and operatively coupled to the front ground engaging members.

16. The utility vehicle of claim 10, wherein a lower edge of the restrictor members is spaced apart from the lower member of the U-shaped frame member.

17. The utility vehicle of claim 10, further comprising an exoskeletal frame supported by the main frame, wherein the restrictor member is supported by the exoskeletal frame.

18. The utility vehicle of claim 10, wherein the restrictor member forms a portion of the outermost lateral surface of the vehicle.

19. The utility vehicle of claim 10, wherein a portion of the restrictor member is pivotable relative to the U-shaped frame member.

20. A method of restraining occupants of a utility vehicle, the method comprising the steps of:
providing a utility vehicle comprising a frame; a plurality of ground engaging members adapted to support the frame above the ground; side-by-side seating supported by the frame, at least two front grounding engaging members being positioned forward of the side-by-side seating and at least two rear ground engaging members being positioned rearward of the side-by-side seating; a plurality of front independent suspensions coupling the at least two front ground engaging members to the frame; a plurality of rear independent suspensions coupling the at least two rear ground engaging members to the frame; a floor supported by the frame and located forward of the side-by-side seating; a dashboard spaced apart from the side-by-side seating, the side-by-side seating, the floor, and the dashboard cooperating to define an operator space extending above the floor, the operator space having a leftside opening and a right-side opening each of which permits ingress and egress relative to the operator space; an engine supported by the frame, the engine being positioned completely rearward of the dashboard; a CVT unit operatively coupled to the engine and operatively coupled to at least a first forward ground engaging member and at least a first rear ground engaging member; a cargo bed supported by the frame and positioned rearward of the side-by-side-seating; and a U-shaped frame member supported by the frame, the U-shaped member bounding a lower portion of the left-side opening of the operator space and including a front rearwardly angled member, a rear forwardly angled member, and a lower member extending between the front rearwardly angled member and the rear forwardly angled member;

coupling a restrictor member to the U-shaped frame member to block an operator's feet from leaving the operator space, the restrictor member extending between the front rearwardly angled member of the U-shaped frame member and the rear forwardly angled member of the U-shaped frame member, a first portion of the restrictor member laterally aligned with the side-by-side seating is completely below a seating surface of the side-by-side seating; and moving the restraint member relative to the U-shaped frame member to faciliate egress by the operator from the operator space.

21. The method of claim 20, wherein the restrictor member is completely below the seating surface of the side-by-side seating.

* * * * *